Feb. 21, 1939.  G. KINER  2,148,075
LIQUID LEVEL INDICATING DEVICE
Filed Aug. 3, 1935  3 Sheets-Sheet 3
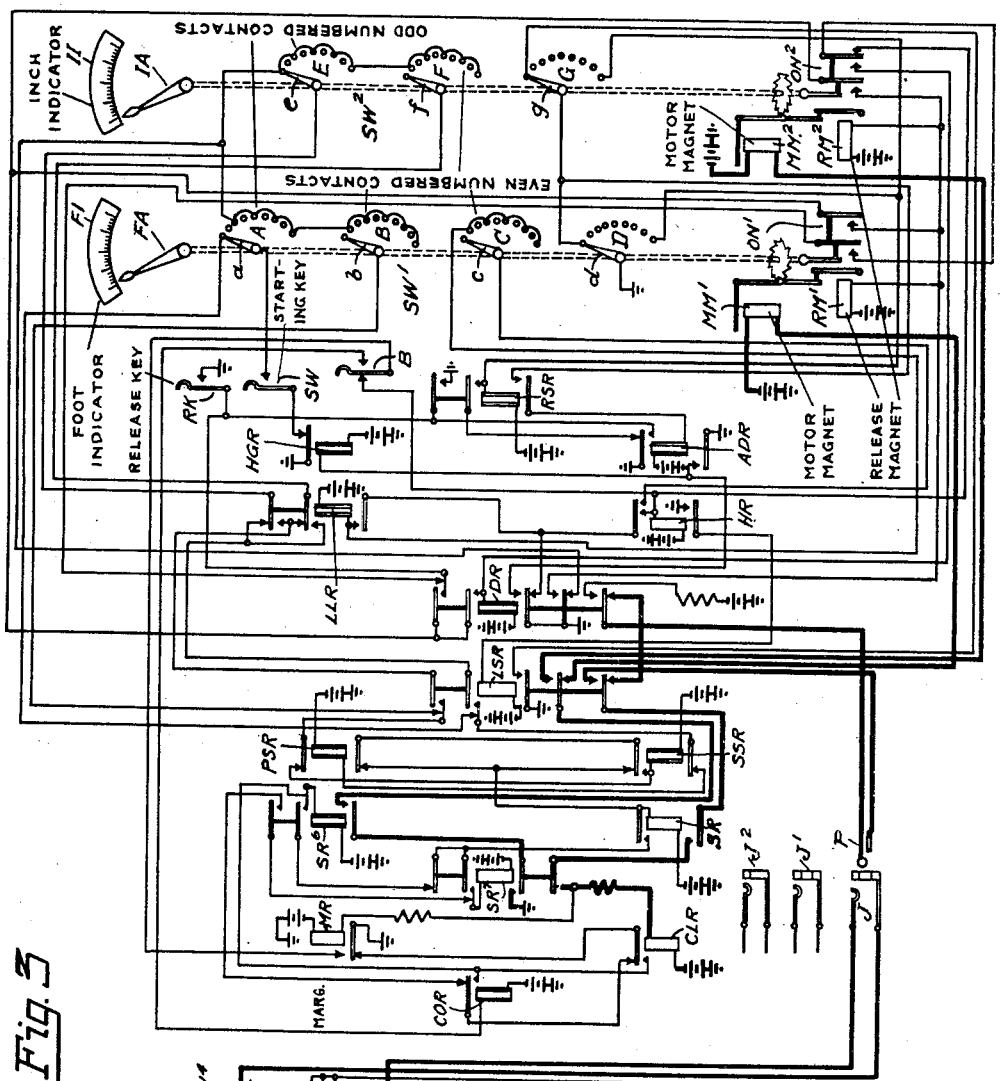
Fig. 3
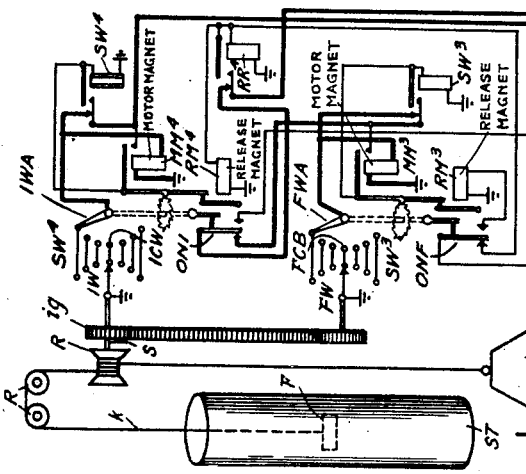
Inventor:
Glenn Kiner
By C. P. Sper
Attorney Patented Feb. 21, 1939

2,148,075

UNITED STATES PATENT OFFICE 2,148,075

LIQUID LEVEL INDICATING DEVICE

Glenn Kiner, Park Ridge, Ill., assignor to Kellogg Switchboard and Supply Company, Chicago, Ill., a corporation of Illinois Application August 3, 1935, Serial No. 34,501

8 Claims. (Cl. 73—313)

My invention relates to an indicating device to be used in conjunction with storage tanks such as those used by oil refineries. The devices heretofore generally used to indicate the fluctuations of the contents of a large group of storage tanks have not been particularly satisfactory as it has been necessary to visit each tank individually and inspect its associated indicator to ascertain the amount of the contents in the tank. The information must then be relayed to the central office or pumping station which in large plants may be a considerable distance from the tank inspected, thereby causing a considerable lapse of time.

It is an object of my invention to provide a simple, efficient and commercially practical system for indicating directly at the central office the amount of the contents in the respective tanks.

It is also an object of my invention to provide an indicating system wherein the indicator and the movable member at the initiating point are always coordinated in their movement.

A further object of my invention is the provision of circuit arrangements whereby the distance between the indicator and the tank are inconsequential so that the same indicator can be used to measure the contents of tanks at different distances from the indicator.

Another object of my invention is the provision in a synchronizing indicating system of means permitting the severing of the connection between the initial point and the indicator whereby the indicator coordinates with the initial member upon their subsequent reconnection.

Another object of my invention is the provision of an indicating system of the type described in which the contents of the tank are shown in feet and inches or fractions thereof.

Another object of my invention is the provision in an indicating system of the type described in which the energy necessary to the operation of the apparatus at the tank end is supplied from the central office.

A further object of my invention is the provision of tank indicating means whereby the contents of the tank are shown in feet and inches and the respective indicators are sequentially operated by electromagnetic means.

Further objects and advantages of my invention will be readily apparent from the following specification considered with the accompanying drawings which depict a particular preferred embodiment of my invention.

Figure 1:
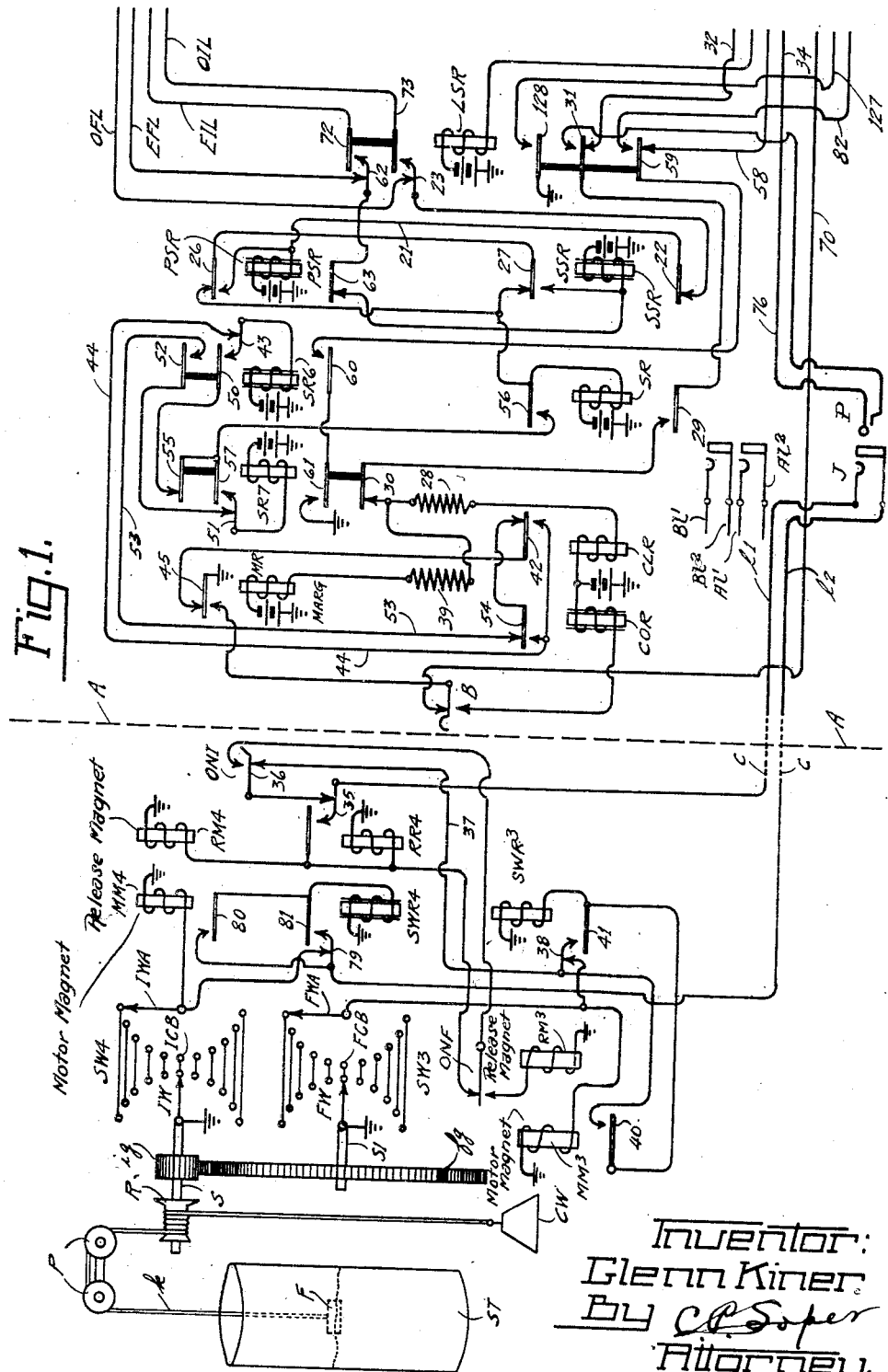
Figure 2:
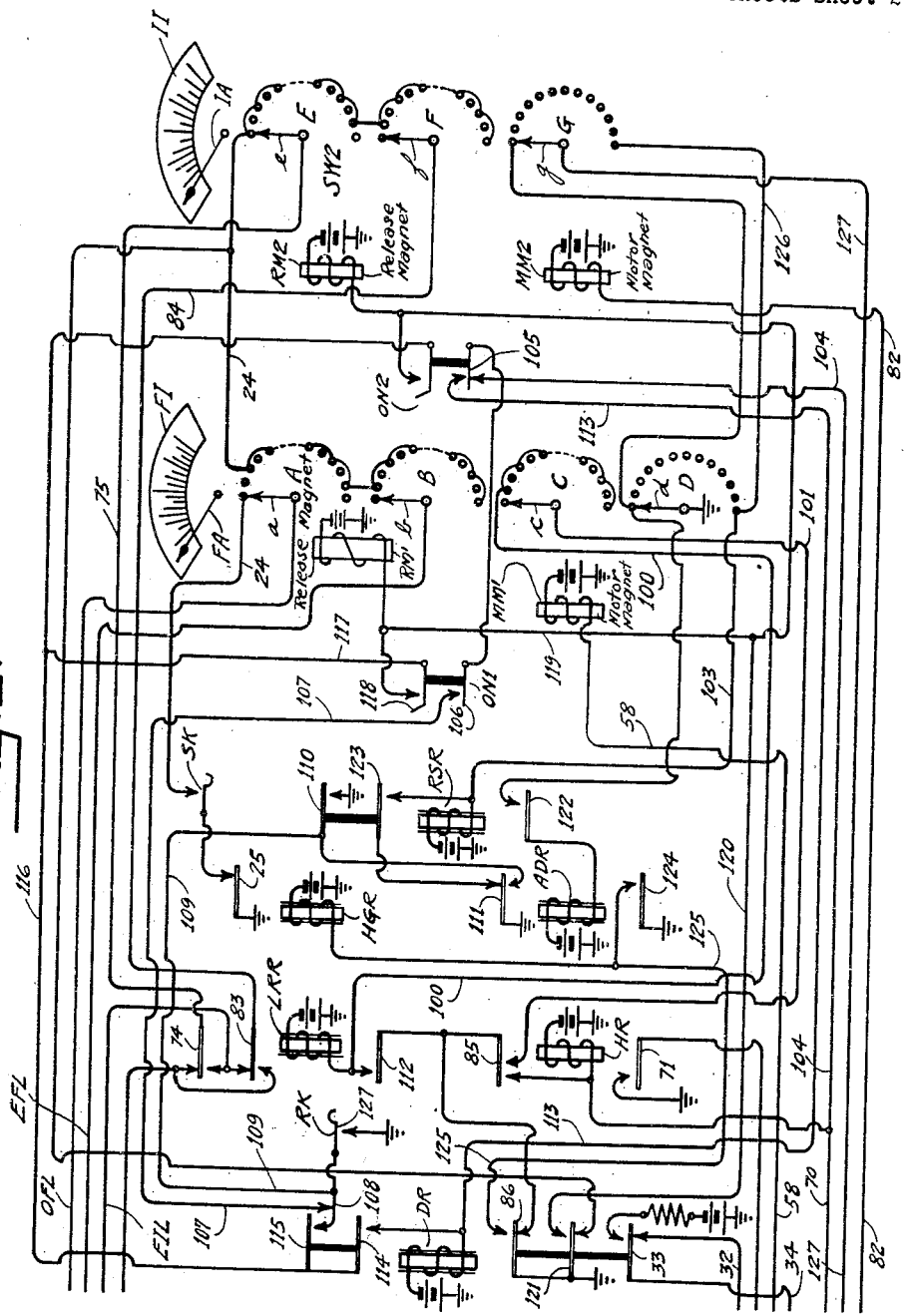

When Fig. 1 is placed to the left of Fig. 2 they show a complete circuit arrangement of my indicating system.

Fig. 3 shows a condensed circuit arrangement of the apparatus with the switches and indicators grouped in a distinctive manner and the various parts labelled with suitable explanatory legends.

Like reference characters on the various drawings indicate like parts. Figs. 1 and 2 show the same circuit arrangement as does Fig. 3, but the parts and conductors are more widely spaced and the various relay armatures are provided with reference characters so as to facilitate the tracing of the operating circuits.

To the left in Fig. 1, I indicate a storage tank ST, the fluctuations in the contents of which are shown upon the indicators FI and II located at the right in Fig. 2 which indicators are located at any desired central point such as a pumping station or the like.

The apparatus shown to the left of the line A—A in Fig. 1 is located at or near the storage tank ST and includes the storage tank ST and a float F which moves up or down as the contents of the tank ST increase or decrease. The movement of the float F is transmitted by means of a cable $k$ traveling over a pair of pulleys P and around a reel R. A counterweight CW serves to balance the cable $k$ and float F. The reel R is rigidly secured to a rotatable shaft S to which is also secured a wiper IW associated with the contact bank ICB. The gear wheel $ig$ is also rigidly secured to the shaft S and meshes with a large gear wheel $fg$ supported by a rotatable shaft SI to which is secured a wiper FW associated with a contact bank FCB.

The contact bank ICB is the inch contact bank and the wiper IW moves from one contact to the next to place a ground potential thereon. A fifty point switch is preferably used whereby the movement of the float F a quarter of an inch moves the wiper IW from one contact to the next. Therefore, the wiper will move from one contact to the next four times for each change of one inch in the contents of the tank and forty-eight times for each change of one foot in the contents of the tank.

When the float F has moved one foot the gear wheel $ig$ affects the gear wheel $fg$ to rotate the shaft SI and cause the foot wiper FW to move to the next contact in the foot contact bank FCB. Thus we see that the inch wiper will move over forty-eight contacts if the tank is gradated in quarter inches, to one movement of the foot wiper FW. A second wiper IWA is provided to step over a second group of contacts electrically connected to the contacts engaged by the inch wiper IW.

A motor magnet MM4 controls the stepping of the said wiper IWA and the release magnet RM4 restores the switch SW4 and the wiper arm IWA to its normal position which is out of engagement with any contact in group ICB under the control of a switching relay SWR4 and the release relay RR4. A second wiper arm FWA steps over a group of contacts in the contact bank FCB electrically connected to the contacts engaged by the wiper FW. Motor magnet MM3, a release magnet RM3, and a switching relay SWR3 perform similar functions in switch SW3 as do previously enumerated relays in connection with switch SW4. Off-normal contacts ON1 operate upon the first movement of switch SW4 off normal, and off-normal contacts ONF operate upon the first movement of switch SW3.

The dotted line C—C indicates two conductors connecting the apparatus located at the tank to the indicating apparatus located at the central office or pumping station and terminates in a jack J. Jacks J1 and J2 are associated with lines AL1 and AL2, and BL1 and BL2, which lead to the apparatus located at different tanks. Any number of such pairs of wires may be provided to lead to any number of storage tanks.

The apparatus at the central station comprises foot indicator FI and an inch indicator II. The foot indicator including the indicator arm FA is operated by a motor magnet MM1 operating in coordination with the motor magnet MM3 located at whichever tank is connected to the indicator at the time, whereby the wipers FWA and the arm FA are so coordinated in their movement that the arm FA will indicate upon the indicating device FI the position of the said wiper FWA associated with the foot contact bank FCB. Wipers $a$, $b$, $c$ and $d$ are simultaneously operated with the wiper arm FA. A release magnet RM1 controls the restoration of the said wiper arms and the off-normal contacts ON1 to normal. The electrical energy used for operating the various electromagnets originates at the central office. No current source of any kind is necessary at the tank end of the line as only a ground connection is necessary there. The drawing shows a source of current at each magnet at the central office but it is to be understood that this is done merely to simplify the drawings and that but a single source of current is to be used and that is to be located at the central office.

Motor magnet MM2 causes the simultaneous operation of the indicator arm IA and wipers $e$, $f$, and $g$. The indicator arm IA is stepped over the indicator II by the motor magnet MM2 and is coordinated in its movements with the indicator arm IWA of switch SW4 to indicate at all times the position of the indicator arm IWA. The release magnet RM2 controls the restoration of the wipers $e$, $f$, $g$, and IA and off-normal contacts ON2 to normal.

A starting key SK is provided to set the indicator into operation and the release key RK is provided to release the indicator after it has been operated. Wiper $a$ is associated with a contact bank A, the odd numbered contacts, except number one, of which are connected together. The wiper $a$ is connected to an odd foot lead OFL and thence to primary start relay PSR. The wiper $b$ is associated with a contact bank B in which the even numbered contacts are looped together and thence connected to the odd numbered contacts in contact bank A. The wiper $b$ is connected to the even foot lead EFL and to the secondary start relay SSR. Contact bank C has the even numbered contacts looped together and the wiper $c$ steps over the contacts in said bank. The wiper $d$ is associated with a contact bank D in which only the first and last contacts of the same are used.

Contact bank E has the odd numbered contacts thereof looped together and thence connected to normal contact 121 of relay DR and the wiper $e$ steps over this contact bank to connect thereto the odd inch lead OIL through the contacts of the lead switching relay LSR and thence to the primary start relay PSR. The contact bank F has its even numbered contacts looped together and thence connected to the contacts of bank E. The contacts in bank F are engaged by the wiper $f$ which connects thereto the even start lead EIL which leads through the contacts of the lead switching relay LSR to the secondary start relay SSR.

Description of operation

Having described my system in general, I will now give a detailed description of the operation of the same. The attendant at the central station desiring to ascertain the amount of oil or other content in a specific tank ST will insert the plug P into the particular jack associated with the desired tank which in this instance is the jack J associated with the storage tank ST and then operate the start key SK. The operation of the key SK closes an energizing circuit for the primary start relay PSR which is energized by current flowing from grounded battery through the winding of relay PSR, conductor 21, normal contact 22 of relay SSR, normal contact 23 of relay LSR, odd foot lead OFL, wiper $a$, contact 1 of bank A, conductor 24, operated key SK, and to ground at normal contact 25 of holding ground relay HGR. Relay PSR will close alternate contact 26 and then start switching relay SR will be energized by current flowing from grounded battery through the winding of relay SR, normal contact 27 of relay SSR, alternate contact 26 of relay PSR and over the above described path to ground at normal contact 25 of relay HGR. Closure of contact 29 of relay SR causes the energization of conditioning line relay CLR by current flowing from grounded battery through the winding of relay CLR, resistance 28, normal contact 30 of switching relay SR1 alternate contact 29 of relay SR, normal contact 31 of relay LSR, conductor 32, normal contact 33 of disconnect relay DR, conductor 34, through the plug and jack, conductor c, normal contact 35 of relay RR4, normal contact 36 of off-normal contacts ON1, conductor 37, normal contact 38 of relay SWR3, and the winding of motor magnet MM3 to ground. A circuit for marginal relay MR is established over the same path but due to the resistance 39 being included in the circuit, the relay MR does not operate at this time, but relay CLR and motor magnet MM3 operate and MM3 closes its alternate contact 40 to establish an operating circuit for switching relay SWR3 which relay SWR3 closes its alternate contact 41 to establish a locking circuit for itself and also opens, at its contact 38, the energizing circuit of motor magnet MM3 which immediately releases and steps the wiper FWA one step to the first contact in the contact bank FCB and also operates the off-normal contact ONF causing it to assume its alternate position.

When relay CLR energized the contact 42 assumed its alternate position and thereby closed an energizing circuit for the switching relay SR6 which relay is actuated by current flowing from grounded battery through the winding of relay SR6, normal contact 43, conductor 44, alternate contact 42 of relay CLR, to ground at normal contact 45 of relay MR.

Relay SR6 upon becoming energized closes make-before-break contact 50 which opens contact 43 to interrupt the original energizing circuit but closes a locking circuit which maintains the relay SR6 in its energized position. This locking circuit can be traced from battery through the winding of relay SR6, alternate contact 50, normal contact 55 of relay SR7, alternate contact 56 of relay SR, normal contact 27 of relay SSR to ground through the start key SK and normal contact 25 of relay HGR over the previously traced circuit.

Relay SR7 is operated by current flowing from grounded battery through the winding of relay SR7, normal contact 51, alternate contact 52, relay SR6, conductor 53, normal contact 54 of continuing operation relay COR and normal contact 42 of conditioning line relay CLR, to ground at normal contact 45 of relay MR. Relay CLR was restored to normal when relay SWR3 was connected in the circuit by the closure of alternate contact 40 of motor magnet MM3. Due to the resistance 28 in the circuit the current flowing through the winding of relay CLR through the resistance 28 and through the winding of relay SWR3 was not sufficient to maintain the relay CLR operated and it restored and opened its contact 42.

Relay SR7 establishes a locking circuit for itself through its alternate contact 57 and alternate contact 56 of relay SR, to ground through the starting key SK. The energization of relay SR7 closes an energizing circuit for the switch motor magnet MM1. This circuit may be traced from battery, through the winding of motor magnet MM1, conductor 58, normal contact 59 of relay LSR, alternate contact 60 of relay SR6 and alternate contact 61 of relay SR7 to ground. The circuit for relay SR6 is opened at contact 55 of relay SR7 and it deenergizes and opens its contact 60. The energizing circuit for the motor magnet MM1 is opened at contact 60 of relay SR6 and the wipers, a, b, c, and d of switch SW1 as well as the indicator arm FA are stepped one step. The movement of the wiper a, of course, opens the energizing circuits of relays PSR, SR, SR7 and SWR3 and these relays restore their contacts to normal.

However, the movement of the wiper b causes it to engage the second contact of contact bank B and this being an even numbered contact is looped with all the other even numbered contacts in the bank and thence to the odd numbered contacts in bank A which are in turn connected by conductor 224 to ground at normal contact 121 of disconnect relay DR. The even foot lead EFL is connected to the wiper b and therefore an energizing circuit for the secondary start relay SSR is closed, current flowing from grounded battery through the winding of relay SSR, normal contact 63 of relay PSR, normal contact 62 of relay LSR, start lead EFL, wiper b, even contact of contact bank B, through the looped odd contacts of contact group A, conductor 224, contact 121 of relay DR to ground.

Relay SR is energized by current flowing from grounded battery through winding of relay SR, normal contact 26 of relay PSR, alternate contact 27 of relay SSR to ground at normal contact 121 of relay DR, over the circuit just traced for relay SSR. Relay SR operating closes its contact 29 which causes the operation of relay CLR by current flowing from grounded battery through the winding of relay CLR, resistance 28, normal contact 30 of relay SR7, alternate contact 29 of relay SR, normal contact 31 of relay LSR, conductor 32, normal contact 33 of disconnect relay DR, conductor 34, through the connected plug P and jack J, conductor c, normal contact 35 of relay RR4, normal contact 36 of ON1, conductor 37, normal contact 38, through the winding of motor magnet MM3. Motor magnet MM3 also operates over this circuit to condition the wiper FWA for its next advancement. Switch relay SWR3 is again energized over the previously traced circuit through alternate contact 40 of motor magnet MM3, and relay SR6 is energized over the previously traced circuit through alternate contact 42 of relay CLR. Upon the energization of relay SWR3, contact 38 is opened with the subsequent falling off of motor magnet MM3 which steps the foot wiper FWA to the next contact in the contact bank FCB. Relay CLR again falls off when switching relay SWR3 is connected in circuit therewith to close an energizing circuit previously traced from the relay SR7 which again energizes to close a second operating circuit for the motor magnet MM1 over the previously described path. Relay SR6 falls off due to the opening of contact 55 of relay SR 7 and opens its contact 60 to interrupt the energizing circuit of motor magnet MM1 which deenergizes and steps the wiper of switch SW1 to the next contact which is again an odd contact.

When wiper b moves from the second contact to the third the energizing circuits for the relays SSR, SR, SR7 and SWR3 are again opened and they restore to normal. A new circuit for relay PSR is established through wiper a contacting the third contact in bank A over a previously described circuit and it operates to again cause the energization of relays SR, CLR and MM3, and then SWR3 to cause the foot wiper FWA to step to the next contact in the bank FCB.

The start relays PSR and SSR are alternately energized through the wipers a and b to step the wiper FWA over the contacts FCB until the contact engaged by the wiper FWA is connected to the contact which is engaged by the wiper FW and which has a ground potential thereby establishing energizing circuits for relays CLR and MR. Circuits for these relays can be traced from grounded battery through their respective windings, resistances 28 and 39, normal contact 30 of relay SR7, alternate contact 29 of relay SR, normal contact 31 of LSR, conductor 32, normal contact 33, conductor 34, connected plug P and jack J, normal contact 35, normal contact 36, conductor 37, normal contact 38, wiper FWA, connected contacts in bank FCB, and wiper FW to ground.

The energization of marginal relay MR causes it to open its contact 45 which prevents the operation of relay SR6 and also closes an energizing circuit for holding relay HR which operates by current flowing from grounded battery through the winding of relay HR, conductor 70, closed contacts of key B, to ground at alternate contact 45 of relay MR. Relay HR closes a locking circuit for itself through its alternate contact 85 and normally closed contact 86 of relay DR.

The even numbered contacts in bank C are looped together and connected by conductor 100 to the winding of lead reversing relay LRR and when the wiper c stops on an even contact an energizing circuit is established for relay LRR and the relay is operated by current flowing from grounded battery through the winding of relay LRR, conductor 100, looped contacts, wiper c, conductor 101, alternate contact 85 of HR and normal contact 86 of relay DR to ground. Relay LRR locks itself up through alternate contact 112 and normal contact 86 to ground. The operation of relay LRR is contingent of course upon the prior operation of relay HR so that there can be no premature operation of relay LRR. It is necessary in the operation of the system that the relays PSR and SSR operate alternately and therefore if the foot switch stops on an even contact the primary start relay PSR will have been the last to operate and as the first inch contact is an odd contact the PSR relay must operate first when the change is made to the inch switch. The lead reversing relay LRR is provided to take care of this contingency and cooperates with the lead switching relay LSR to attain the desired operation. Relay HR closes its alternate contact 71 to establish an obvious energizing circuit for the lead switching relay LSR. Relay LSR closes alternate contacts 72 and 73 to disconnect the primary starting relay PSR from the odd foot lead OFL and connect it to the odd inch lead OIL and to disconnect the secondary start relay SSR from the even foot lead EFL and connect it to the even inch lead EIL. Contact 31 assuming its alternate position deenergizes relay CLR and MR. The closure of contact 73 of LSR establishes an energizing circuit for primary start relay PSR which may be traced from grounded battery through the winding of relay PSR, normal contact 22 of SSR, alternate contact 73 of LSR, odd inch lead OIL, normal contact 74 of lead reversing relay LRR, conductor 75, wiper e, odd contact 1 in bank E, conductor 224 normal contact 121 of disconnect relay DR. Relay SR is then energized by current flowing from grounded battery through the winding of relay SR, normal contact 27 of relay SSR, alternate contact 26 of relay PSR over the just traced circuit to ground at normal contact 121 of relay DR.

If the wipers of the foot switch SW1 had stopped on even contacts the lead reversing relay LRR would be in an energized condition and the odd and even start leads would be reversed so that the primary relay USR would be connected to the even lead EIL and the secondary start relay SSR would be connected to the odd lead OIL at the contacts of LRR. Under such a condition the secondary start relay SSR would be the first to operate when the changeover to the inch switch SW2 was made.

Relay CLR is energized by current flowing from grounded battery through the winding of relay CLR, resistance 28, normal contact 30, alternate contact 29, alternate contact 31 of relay LSR, conductor 76, plug P and jack J, conductor c, normal contact 79 of relay SWR4 through the winding of motor magnet MM4 to ground. The motor magnet MM4 is also operated by current flowing over this circuit and closes its contact 80 to establish an energizing circuit for the switching relay SWR4 which relay interrupts circuit of motor magnet MM4, which deenergizes and steps the inch wiper IWA to the first contact in the inch contact bank ICB. Relay CLR of course falls off due to the added resistance in the circuit provided by the inclusion of relay SWR4 therein.

Relay SR6 operated when relay CLR energized as described in connection with the operation of switch SW4 and locked up through the contact 55 of relay SR7 and contact 56 of relay SR. Relay SR7 also operates and the energizing circuit for the motor magnet MM2 of switch SW2 is closed. The circuit can be traced from grounded battery through the winding of motor magnet MM2, conductor 82, alternate contact 59 of LSR, alternate contacts 60 and 61 to ground. When relay SR6 restores to normal due to the opening of contact 55 of relay SR7 the circuit for the motor magnet MM2 is destroyed and it deenergizes and steps the wipers e, f and g to the second contact of their associated contact banks and moves the arm IA to its first position on the dial. The movement of wiper e to the second contact opens the energizing circuits of the relays PSR, SSR and SR7. The engagement of contact f with the second contact in the group F closes an energizing circuit for the secondary start relay SSR which operates by current flowing from grounded battery through the winding of relay SSR, normal contact 63 of relay PSR, alternate contact 72 of relay LSR, even inch lead EIL, normal contact 83 of relay ADR, conductor 84, wiper f, even contact bank F, the looped odd contacts of bank E, conductor 224, normal contact 121 of relay DR to ground. Relay SSR closes its alternate contact 27 which causes the operation of relay SR over a previously described circuit and relay SR closes its alternate contact 29 to cause the energization of relay CLR by current flowing from grounded battery through the winding of relay CLR, resistance 28, normal contact 30, alternate contact 31 of relay LSR, conductor 76, plug P, jack J, conductor c, normal contact 79 of relay SWR4, through the winding of motor magnet MM4. The magnet MM4 operates to close its contact 80 which closes an energizing circuit for switching relay SWR4 which energizes as above described and causes the deenergization of motor magnet MM4 which thereupon steps the inch wiper IWA to the next contact in the inch contact bank ICB.

Relays SR6 and SR7 again operate to close a new energizing circuit for the motor magnet MM2 of switch SW2 and then open the said circuit to cause the deenergization of the said motor magnet MM2 and the stepping of its associated wipers e, f, and g to the next contacts in their associated contact banks. The relays PSR and SSR are thus alternately energized through the wipers e and f and cause the motor magnet MM4 to be energized and deenergized to step the wiper IWA until the contact is reached which has ground potential placed thereon by the wiper IW, the motor magnet MM2 of course coordinating its operation therewith to step its associated wipers.

When the grounded contact is reached energizing circuits for the marginal relay MR and relay CLR are established. These circuits can be traced from grounded battery through the winding of relay MR and resistance 39 to closed contact 30 of relay SR7 and from grounded battery through the winding of relay CLR and resistance 28 to closed contact 30 of relay SR7 where it joins the first circuit, thence alternate contact 29 of relay SR, alternate contact 31 of relay LSR, conductor 76, plug P and jack J, closed contact 79, wiper IWA, contact bank ICB, wiper IW to ground. Relay MR energizes and contact 45 assumes its alternate position thereby preventing the further operation of relay SR6 and closing an energizing circuit for the holding relay HR which is operated by current flowing from grounded battery, through the relay HR, conductor 70, closed contacts of key B, to ground at alternate contact 45 of relay MR. Relay HR locks up through alternate contact 85 and normal contact 86 of relay DR. The deenergization of relays SR6 and SR7 opens the energizing circuit of motor magnet MM2 which deenergizes and steps its associated wipers and the indicator arm IA to the final position.

As soon as the inch switch SW2 has stopped operating the attendant can read the indicators FA and IA and record the exact amount of the contents of the tank in feet and inches and quarters thereof. A chart may be provided for translating the height of the contents expressed in feet and quarter inches into gallons or cubic feet as obviously the contents of a tank twenty feet in diameter will not be the same in amount as a tank thirty feet in diameter even though the height of the contents is the same in the respective tanks.

*Foot switch misses grounded contact*

Should either the foot switch FWA or inch switch IWA fail to stop upon the grounded contact, for any reason, it will of course continue to operate until the last contact is reached. The indicator switch SW1 or SW2 will coordinate with its associated tank switch and step its wipers to the last contact. If it is the foot switch which missed, the wiper d upon reaching the last contact in the bank will close an energizing circuit for the repeat switching relay RSR which will be operated by current flowing from grounded battery, through the winding of relay RSR, conductor 103, wiper d to ground. Relay RSR closes a locking circuit for itself through alternate contact 123 and normal contact 111 of relay ADR and also completes an energizing circuit for the holding relay HR which can be traced from grounded battery through the winding of HR, conductor 104, normal contact 105 of ON2, alternate contact 106 of ON1, which assumed its alternate position when the switch SW1 first operated, conductor 107, normal contact 108 of disconnect relay DR, conductor 109 and alternate contact 110 of RSR. Relay HR again locks itself up to ground through contacts 85 and 86. The closing of alternate contact 71 establishes an energizing circuit as previously traced for the lead switching relay LSR. The lead reversing relay LRR is also operated, as the last contact in the bank is an even one, by current flowing through contacts 85 and 86 to ground. The operation of relays LSR and LRR assures the proper sequential operation of the start relays PSR and SSR.

The secondary start relay SSR operates over a circuit previously traced through alternate contact 72 of relay LSR, conductor EIL, alternate contact 74 of LRR, conductor 75 to wiper e and thence to ground. Relay SSR causes the subsequent operation of relays SR, CLR, SR6 and SR7 which cause the operation of motor magnet MM4 to step the wiper IWA to the first contact. As soon as this happens the motor magnet MM2 of the inch indicator switch is operated and the wipers e, f, g and IA are moved one step. Upon the first movement the off-normal contacts ON2 are moved to their alternate position which completes an energizing circuit for the disconnect relay DR. The relay DR is energized by current flowing from grounded battery, through the winding of relay DR, conductor 113, alternate contact 105 of ON2, alternate contact 106 of ON1, conductor 107, normal contact 108 of DR, conductor 109, to ground at contact 110 of RSR. Relay DR closes a locking circuit for itself through its alternate contact 114, conductors 116 and 117, alternate contact 118 of ON1, conductors 119 and 120, alternate contact 121 of relay DR to ground. The opening of make-before-break contact 108 of relay DR opens the original energizing circuit of relay DR but closes another locking circuit to ground at contact 110 of relay RSR. An energizing circuit for holding ground relay HGR is established by the closing of alternate contact 86 of relay DR. Relay HGR is operated by current flowing from grounded battery, through the winding of relay HGR, conductor 125, alternate contact 86 of DR to ground. Relay HGR attracts its normal contact 25 and opens the circuit for the starting relays so that they will not operate when the switch SW1 is returned to its normal position.

The opening of normal contact 121 opens the locking circuit of relays LRR and HR which deenergize and restore their contacts to normal.

Release magnets RM1 and RM2 are energized by current flowing from grounded battery through the windings of the respective magnets RM1 and RM2, conductor 120, alternate contact 121 of relay DR to ground. The operation of the release magnets restores the indicator switches SW1 and SW2 and their associated off-normal springs ON1 and ON2 to their normal positions.

Meanwhile the closure of alternate contact 33 of relay DR completed an energizing circuit for the release magnet RM3 which can be traced from grounded battery, through alternate contact 33 of relay DR, conductor 34, line 1, connected plug P and jack J, normal contact 35, alternate contact 36 of ON1, alternate contact ONF, winding of magnet RM3 to ground. The release magnet RM3 restores the foot switch wiper FWA and the off-normal spring ONF to normal. This closes an energizing circuit for the release magnet RM4 and the release relay RR4. The former restores the inch switch wiper IWA and off-normal contact 36 to normal. A substitute circuit for the magnet RM4 and relay RR4 is established through alternate contact 35 of relay RR5.

When the wiper d of the foot indicator switch reached its normal position an energizing circuit for auxiliary disconnect relay ADR is established. This relay is energized by current flowing from grounded battery through the winding of relay ADR, alternate contact 122 of relay RSR, wiper d to ground. Holding ground relay HGR has a secondary energizing circuit completed through contact 124 of relay ADR. The locking circuit for relay RSR is opened at contact 111 and it restores and opens the energizing circuits of relays ADR and DR which restore to normal and cause the deenergization of all the release magnets, relay RR4, and holding ground relay HGR. As the start key SK is still in its operated condition the closure of normal contact 25 of holding ground relay HGR completes the initial operating circuit for the primary start relay PSR which energizes and starts the system operating as though it was just started originally. The switch SW3 will step to seek the grounded contact in bank FCB and the indicator switch SW1 will coordinate its movement with the switch SW.

Inch switch misses ground contacts

If it is the wiper IWA of the inch switch SW4 which misses the grounded contact, the said switch SW4 will continue to operate until the wiper reaches the last contact in the group and of course the inch indicator switch SW2 will coordinate with the said switch SW4 and when the wiper g reaches the last contact in the contact bank G an energizing circuit will be established for the repeat switching relay RSR. The relay RSR will be energized by current flowing from grounded battery through the winding of relay RSR, conductors 103 and 126, wiper g, conductor 127, alternate contact 128 of lead switching relay LSR to ground. Relay RSR closes a locking circuit for itself through its alternate contact 123 and normal contact 111 of relay ADR. The energizing circuit for the disconnect relay DR through the off-normal contacts ON1 and ON2 previously traced in connection with the missing of the ground contact by the foot switch is completed to ground at alternate contact 110 of the relay RSR. The remaining disconnection of the switch takes place in the same manner as described in relation to the disconnection when the foot switch misses the ground contact.

As soon as the wiper a reaches its normal position relay HGR has closed its normal contact 25, the foot switch SW3 will step the wiper FWA to the grounded contact in foot contact bank FCB. The foot indicator switch SW1 will coordinate its movements with said switch SW3 and then the inch switch SW4 will step the wiper IWA to the grounded contact in the contact bank ICB and the inch indicator switch SW2 will operate in coordination therewith to indicate the position of the contents in the storage tank ST.

Continuous foot recording

If it is desirous of setting the system so as to follow the continuous operation during the filling of the storage tank ST the key B will be operated. The start key SK will then be operated to cause the foot switch SW3 to step the wiper FWA into engagement with the grounded contact in the bank FCB. When this contact is reached as before explained the marginal relay MR will be operated by current therein from grounded battery, through the winding of relay MR, resistance 39, normal contact 30 of switching relay SR7, alternate contact 29 of start relay SR, normal contact 31 of relay LSR, conductor 32, normal contact 33 of disconnect relay DR, conductor 34, line 1, connected plug and jack, conductor C, normal contact 35 of relay RR4, normal contact 36 of ON1, conductor 37, normal contact 38, wiper FWA, connected contacts in the bank FCB, wiper FW to ground. An energizing circuit for the continuing operation relay COR may be traced from grounded battery, winding of relay COR, alternate contact of key B, alternate contact 45 of marginal relay MR to ground. The inch switch SW2 does not operate upon the cessation of movement of the foot switch as the holding relay HR cannot operate because its original operating circuit is open at key B.

As the contents in storage tank ST increase the wiper FW is moved to the next highest contact and the motor magnet MM3 is energized and causes, by the closure of alternate contact 40, the operation of relay SWR3 which shorts out the motor magnet MM3 and drives the wiper FWA to the next contact in the contact bank FCB which of course is now the grounded contact. The relay S3 remains locked up over the line L1 from battery through the relays CLR and MR which, however, release due to the reduced flow of current through the resistances 28 and 39, and the winding of relay SWR3. Relay SR6 is operated by current flowing from grounded battery through winding of relay SR6, normal contact 43, conductor 44, alternate contact 56 of slow to release relay COR, normal contact 42, of relay CLR to ground at normal contact 45 of relay MR. An energizing circuit for the switching relay SR7 is completed and may be traced from grounded battery through the winding of relay SR7, normal contact 51, alternate contact 52 of SR6, conductor 53, normal contact 54 of relay COR which has released at this time, normal contact 42 of relay CLR to ground at normal contact 45 of relay MR. The closing of alternate contact 60 of relay SR6 and contact 61 of relay SR7 completes the energizing circuit for the motor magnet MM1 which operates and the release of the contacts 60 and 61 causes the deenergization of the motor magnet MM1 which steps the wipers associated with the switch SW1 to the next position.

The circuit of relay SWR3 is, of course, opened when relay SR7 operates and the contact 30 assumes its alternate position. When the wiper A or B is moved to the next contact the energizing circuit of the primary start relay PSR or the secondary start relay SSR is opened and the relay involved restores and causes the restoration of the start relay SR. However, when the wiper A or B reaches a grounded contact either the relay PSR or relay SSR will operate and cause the energization of the start relay SR and if the wiper FWA is then connected to a contact which is grounded the motor magnet MM3 will not operate but the relays CLR and MR and COR will operate and remain energized until the ground is moved to the next contact by wiper FW at which time motor magnet MM3 will again operate and the above operation will be repeated so long as the key B is operated.

Manual release of system

The release of the system is secured by moving key SK to its release position and operating release key RK. Ground at contact 127 establishes an energizing circuit for the disconnect relay DR. This circuit can be traced from grounded battery through the winding of relay DR, conductor 113, alternate contact 105 of ON2, alternate 106 of ON1, conductor 107, alternate contact 127 of key RK to ground. The operation of the disconnect relay DR brings about the release of the switches SW1, SW2, SW3 and SW4 in the same manner as described in connection with the automatic release when the grounded contact is missed by one of the wipers. The switches, however, will not restart until the start key SK is again moved to the starting position.

While I have shown a particular embodiment of my invention, it will be understood that I do not wish to be limited thereto since many modifications both in the circuit arrangement and instrumentalities employed may be made and I therefore desire to cover any such modifications as may come within the spirit and scope of the appended claims.

Having described my invention, what I claim as new and desire to secure by United States Letters Patent is:

1. A first contact bank, a wiper associated with said contact bank, a second contact bank, a wiper associated with said second contact bank, said wiper arms movable in a fixed relationship for placing a potential on a contact in their respective associated banks, a second wiper for each bank, a motor magnet for each second wiper and electrical operating circuits therefor to cause said wiper to sequentially select the contacts having a potential thereon, a first indicating device and a second indicating device each comprising an indicating arm and a scale associated therewith and relay means comprising motor magnets operating said indicating arms, a primary start relay and a secondary start relay for starting the operation, respectively, of said motor magnets for said indicating arms, and switching relays controlling the operating electrical circuits of said motor magnets and said relays, and a single conductor connecting the respective motor magnets for controlling the movement of said respective second wipers and said indicating devices to synchronize said indicating devices and their respective associated arms, and relay means for restoring and restarting said wipers and said indicating arms when said wipers miss said contacts having a potential thereon.

2. A bank of contacts, means for placing a potential on any selected contact in said bank, a wiper adapted to move over said contacts to locate said potential, an electromagnet controlling said wiper, a second bank of contacts, means for placing a potential on any selected contact in said second bank, a second wiper adapted to sequentially step over said second bank of contacts to locate said potential, a second electromagnet for operating said second wiper, an indicating arm associated with said first wiper, a second indicating arm associated with said second wiper, electromagnets controlling said indicating arms, electrical circuits for said electromagnets, switching relays having contacts controlling the energizing circuits of said electromagnets for sequentially operating said indicating arms in coordination with their respective associated wipers, and a single conductor connecting the respective associated wiper controlling electromagnets.

3. A contact bank, a wiper associated therewith, a second contact bank, a second wiper associated therewith, means placing a distinguishing potential on contacts in the respective contact banks, electromagnetic means for driving said wipers to said potentialized contacts, an indicating arm associated with the first wiper, a second indicating arm associated with the second wiper, energizing circuits for said electromagnets, switching relays controlling said circuits and operating said electromagnets for sequentially operating said indicator arms in coordination with their associated wipers, and relay means for restoring and restarting said wipers and said indicating arms when said wipers miss said contacts having a potential thereon, and a single conductor connecting the respective associated electromagnets.

4. In a system of the character described comprising a central station and a remote station, the apparatus at said remote station comprising a contact bank, a wiper associated therewith, a second contact bank, a second wiper associated therewith, means placing a distinguishing potential on contacts in the respective contact banks, electromagnets for driving said wipers to said potentialized contacts, a pair of indicating arms respectively associated with said wipers, electromagnets controlling said indicating arms, an odd lead and an even lead, a primary start relay and a secondary start relay alternately connected to said leads to control the energizing circuit of the electromagnets controlling said indicating arms, electrical circuits for said relays and electromagnets, switching relays controlling said circuits.

5. In a system of the character described including a central station and a remote station, an indicating device located at said central office and comprising a pair of indicating arms, switching means for connecting said indicating device to said remote station, a pair of wiper arms at said remote station, an electromagnet for driving each of said wiper arms, electrical energizing circuits for said electromagnets at said remote station for sequentially operating said wiper arms and electromagnetic means at said central station comprising an electromagnet for operating each of said indicator arms, a primary start relay and a secondary start relay, a pair of leads alternately connected to said primary and secondary relays for controlling said indicator arms, electrical circuits for said relays and electromagnets for sequentially operating said indicator arms in coordination with their respective associated wiper arms.

6. A contact bank, a wiper associated therewith, a second contact bank, a second wiper associated therewith, means placing a distinguishing potential on contacts in the respective contact banks, an electromagnet for each wiper, electrical circuits for said electromagnets, switching relays controlling said circuits for driving said wipers to said potentialized contacts, an indicating arm associated with the first wiper, a second indicating arm and electromagnets controlling said arms, a primary start relay and a secondary start relay, electrical circuits for said relays and electromagnets, switching relays controlling said circuits to cause the operation of said start relays to energize the electromagnets controlling said indicator arms for sequentially operating said indicator arms in coordination with their associated wipers, said relay means and electromagnets restoring and restarting said wipers and said indicating arms when said wipers miss said contacts having a potential thereon.

7. In a system of the character described including a tank, an indicator for showing the height of the contents of said tank, an electromagnetically operated device at said tank adapted to assume a position corresponding to the height of the contents of said tank, electrical conducting means for connecting said indicator to said electromagnetically controlled devices at said tank, and means, comprising a primary start relay and a secondary start relay, odd and even leads associated with said relays and said indicator actuating device, electrical circuits for said relays and switching relays controlling said circuits, for coordinating the position of the indicator and said electromagnetically controlled device at the tank.

8. In a system of the character described including a tank, an indicator for showing the height of liquid in said tank, an electromagnetically operated device for actuating said indicator, an electromagnetically operated device associated with said tank, switching means for connecting said indicator controlling device with said device associated with said tank, a float in said tank, means for restoring said electromagnetically operated devices to normal positions, means for causing movement of said connected electromagnetically operated device associated with the tank, means controlled by said float for causing the electromagnetically operated device associated with said tank to stop upon reaching a position corresponding to the level of liquid in said tank, and means controlled through said switching means for causing said indicator actuating electromagnetically operated device to move said indicator to a position corresponding to the position assumed by the electromagnetically operated device associated with the tank.

GLENN KINER.